(12) United States Patent
Carey et al.

(10) Patent No.: US 7,546,547 B2
(45) Date of Patent: Jun. 9, 2009

(54) METHOD, APPARATUS AND COMPUTER PROGRAM PRODUCT FOR IMPLEMENTING AUTOMATIC REAPPORTIONMENT OF GRAPHICAL SUBWINDOWS BASED UPON SENSED, DYNAMIC CHANGES

(75) Inventors: James Edward Carey, Rochester, MN (US); Scott N. Gerard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 425 days.

(21) Appl. No.: 11/138,996

(22) Filed: May 26, 2005

(65) Prior Publication Data

US 2006/0271862 A1 Nov. 30, 2006

(51) Int. Cl.
*G06F 3/048* (2006.01)

(52) U.S. Cl. .................. 715/788; 715/762; 715/778; 715/792; 715/794; 715/795; 715/798; 715/800; 715/255; 715/266; 715/267; 714/35; 714/38

(58) Field of Classification Search ............... 715/759, 715/762, 778, 781, 788, 792, 793, 794, 795, 715/798, 799, 800, 255, 266, 267; 714/34, 714/35, 38, 39, 48
See application file for complete search history.

(56) References Cited

U.S. PATENT DOCUMENTS

| 5,227,771 | A | * | 7/1993 | Kerr et al. ............... 715/800 |
| 5,377,317 | A | | 12/1994 | Bates et al. |
| 5,390,295 | A | | 2/1995 | Bates et al. |
| 6,049,334 | A | | 4/2000 | Bates et al. |
| 6,184,883 | B1 | | 2/2001 | Bates et al. |
| 6,342,908 | B1 | * | 1/2002 | Bates et al. ............. 715/798 |
| 2003/0142139 | A1 | * | 7/2003 | Brown et al. ............ 345/800 |
| 2007/0209019 | A1 | * | 9/2007 | Kaval et al. ............. 715/788 |

* cited by examiner

*Primary Examiner*—Weilun Lo
*Assistant Examiner*—Rashedul Hassan
(74) *Attorney, Agent, or Firm*—Joan Pennington

(57) ABSTRACT

A method, apparatus and computer program product are provided for implementing automatic reapportionment of graphical screen subwindows based upon sensed, dynamic changes. Predefined dynamic change information is monitored for selected subwindows. The monitored predefined dynamic change information is compared with user selected configuration values to determine a reapportionment for the selected subwindows.

18 Claims, 8 Drawing Sheets

```
┌─────────────────────────────────────────────────────────┐
│ [J]ValidationTest.java / [J]WorkspaceBSMUnitTestCase.java✕│□│
├─────────────────────────────────────────────────────────┤
│         }                                          ▲    │
│         private String dotsToSlashes (String input) {┌─406│
│   ▽     char[ ] chars = input.toCharArray();       │    │
│         ▓▓for (int i=0;i<chars.length;i++) {▓▓     │402 │
│           if(chars[i] == ".") {                    │    │
│               chars[i] = "/"                       │    │
│           }                                        │    │
│         }                                          │    │
│         return(new String(chars));                 ▼    │
│       }                                                 │
│     }                                                   │
│ ◀                                              ▶        │
├─────────────────────────────────────────────────────────┤
│ 🖥 Console ✕\ Tasks | JUnit  □ ✕ 🗎 🗐 ♦ 🗎 🖳 🗂        │
│ <terminated>BSMTesting[Run-time Workbeanch]C:\Program Files\IBM\Java142\bin\javaw.exe (Date Time)│
│ Starting plugin com.imb.ws.sca.deploy                   │
│ Starting plugin com.ibm.ws.sca.rapiddeploy      404     │
│ null                                                    │
│ <BPELGenPlugin()                                        │
│ >BPLEGenPlugin.start(...)                               │
└─────────────────────────────────────────────────────────┘
```

FIG. 4

METHOD, APPARATUS AND COMPUTER PROGRAM PRODUCT FOR IMPLEMENTING AUTOMATIC REAPPORTIONMENT OF GRAPHICAL SUBWINDOWS BASED UPON SENSED, DYNAMIC CHANGES

FIELD OF THE INVENTION

The present invention relates generally to the data processing field, and more particularly, relates to a method, apparatus and computer program product for implementing automatic reapportionment of graphical screen subwindows based upon sensed, dynamic changes.

DESCRIPTION OF THE RELATED ART

Currently state-of-the-art computer systems and user interfaces have advanced with inexpensive, personal computers and workstations having powerful graphics processors and multi-tasking operating systems. With these operating systems, the user can simultaneously work on many tasks at once, each task being confined to its own display panel, called a window. The thrust of all graphical user interface (GUI) desktops is to manage multiple applications, each application requiring a window or portion of the available screen. In a window including multiple subwindows with dynamic changes often it is difficult for the user to control the screen area to effectively display each subwindow.

As used in the following specification and claims, it should be understood that the terms graphical screen subwindow and subwindow are used interchangeably and mean a portion of a display screen including a window, a panel within a window, and a portal.

A need exists for an effective mechanism for implementing automatic reapportionment of graphical subwindows based upon sensed, dynamic changes.

SUMMARY OF THE INVENTION

Principal aspects of the present invention are to provide a method, apparatus and computer program product for implementing automatic reapportionment of graphical screen subwindows based upon sensed, dynamic changes. Other important aspects of the present invention are to provide such method, apparatus and computer program product for implementing automatic reapportionment of graphical subwindows based upon sensed, dynamic changes substantially without negative effect and that overcome some of the disadvantages of prior art arrangements.

In brief, a method, apparatus and computer program product are provided for implementing automatic reapportionment of graphical screen subwindows based upon sensed, dynamic changes. Predefined dynamic change information is monitored for selected subwindows. The monitored predefined dynamic change information is compared with user selected configuration values to determine a reapportionment for the selected subwindows.

In accordance with features of the invention, monitored predefined dynamic change information includes one or more of a breakpoint, an amount of information visible, a time rate of change of a particular selected subwindow, a time rate of change of other selected subwindows, a current size of a particular selected subwindow and other selected subwindows.

In accordance with features of the invention, user selected configuration values include one or more of a manual size lock, a maximum screen subwindow size, a minimum screen subwindow size, a size increase amount, a duration and size decrease amount.

BRIEF DESCRIPTION OF THE DRAWINGS

The present invention together with the above and other objects and advantages may best be understood from the following detailed description of the preferred embodiments of the invention illustrated in the drawings, wherein:

FIGS. 2, 3, and 4 are exemplary display screens or exemplary display screen windows of the system of FIGS. 1A and 1B respectively illustrating automatic reapportionment of graphical screen subwindows based upon sensed, dynamic changes in accordance with the preferred embodiment;

DETAILED DESCRIPTION OF THE PREFERRED EMBODIMENTS

Figure 1A:
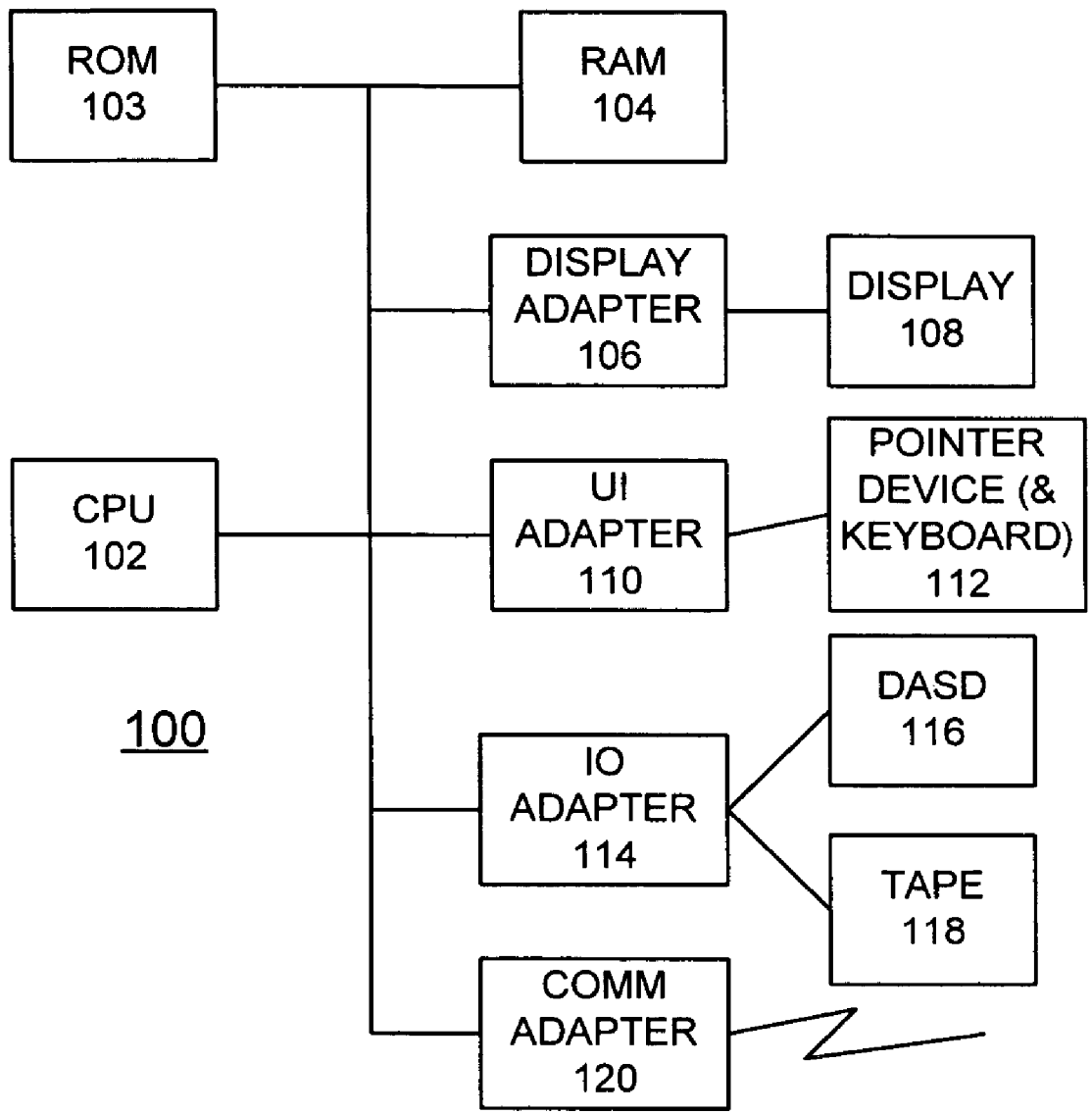
FIGS. 1A and 1B are block diagram representations illustrating a computer system and operating system for implementing automatic reapportionment of graphical screen subwindows based upon sensed, dynamic changes in accordance with the preferred embodiment.
Figure 1B:
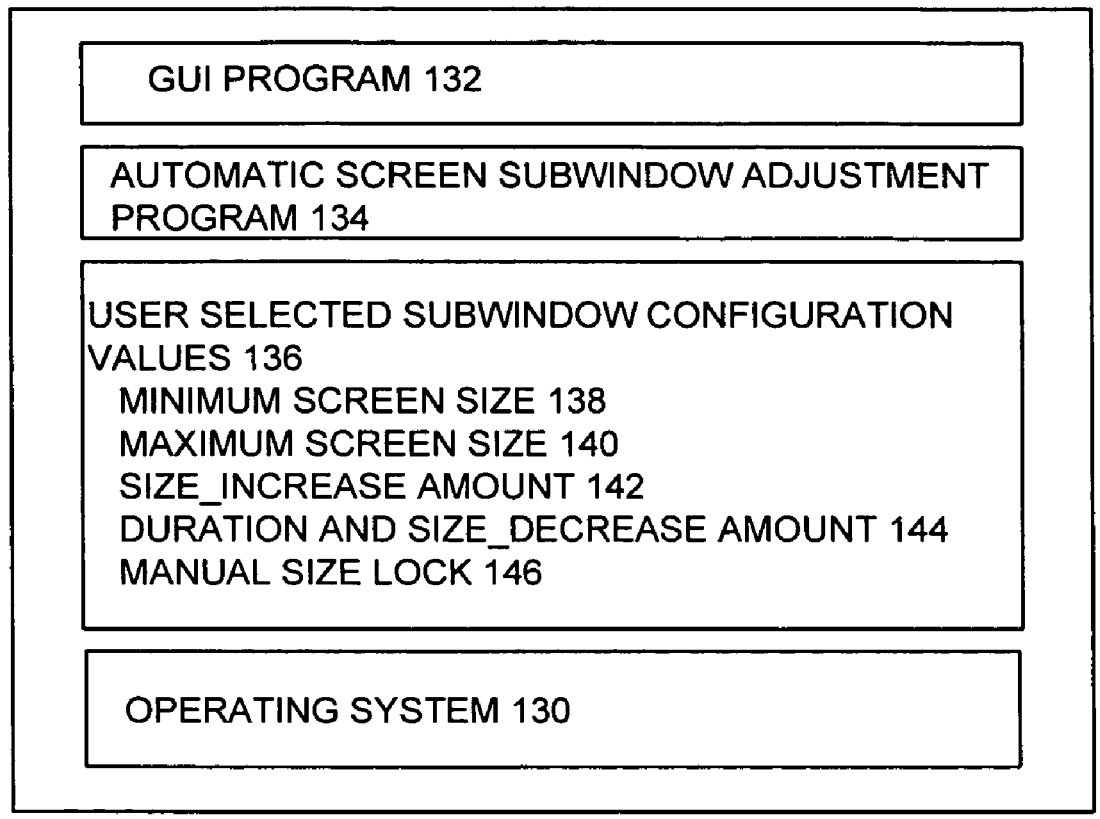

Having reference now to the drawings, in FIGS. 1A, and 1B, there is shown a computer or data processing system generally designated by the reference character 100 for implementing automatic reapportionment of graphical screen subwindows based upon sensed, dynamic changes in accordance with the preferred embodiment. As shown in FIG. 1A, computer system 100 includes a central processor unit (CPU) 102, a read only memory 103, a random access memory 104, a display adapter 106 coupled to a display 108. CPU 102 is connected to a user interface (UI) adapter 110 connected to a pointer device and keyboard 112. CPU 102 is connected to an input/output (10) adapter 114 connected to a direct access storage device (DASD) 116 and a tape unit 118. CPU 102 is connected to a communications adapter 120 providing a communications function. It should be understood that the present invention is not limited to a computer model with a single CPU, or other single component architectures as shown in FIG. 1A.

As shown in FIG. 1B, computer system 100 includes an operating system 130, a graphical user interface (GUI) program 132, and an automatic screen subwindow adjustment program 134 of the preferred embodiment. It should be understood that automatic graphical screen subwindows reapportionment methods of the preferred embodiment can be provided as integral features of the GUI program 132, or as shown with a separate subwindow adjustment program 134 used together with the GUI program 132. A plurality of user selected subwindow configuration values 136 is stored and maintained in accordance with the preferred embodiment.

Configuration values 136 for each subwindow of the preferred embodiment include, for example, a minimum screen size 138, a maximum screen size 140, a size_increase amount 142, a duration and size_Decrease amount 144, and a manual size lock 146.

Figure 2:
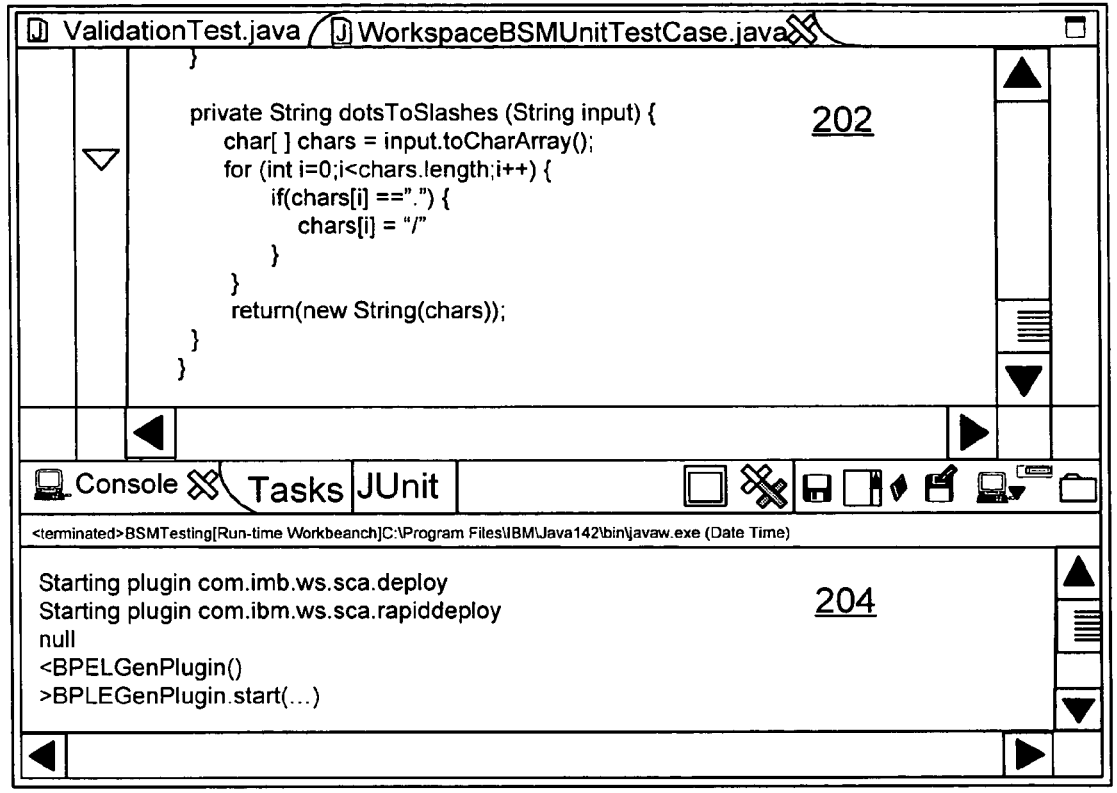
Figure 3:
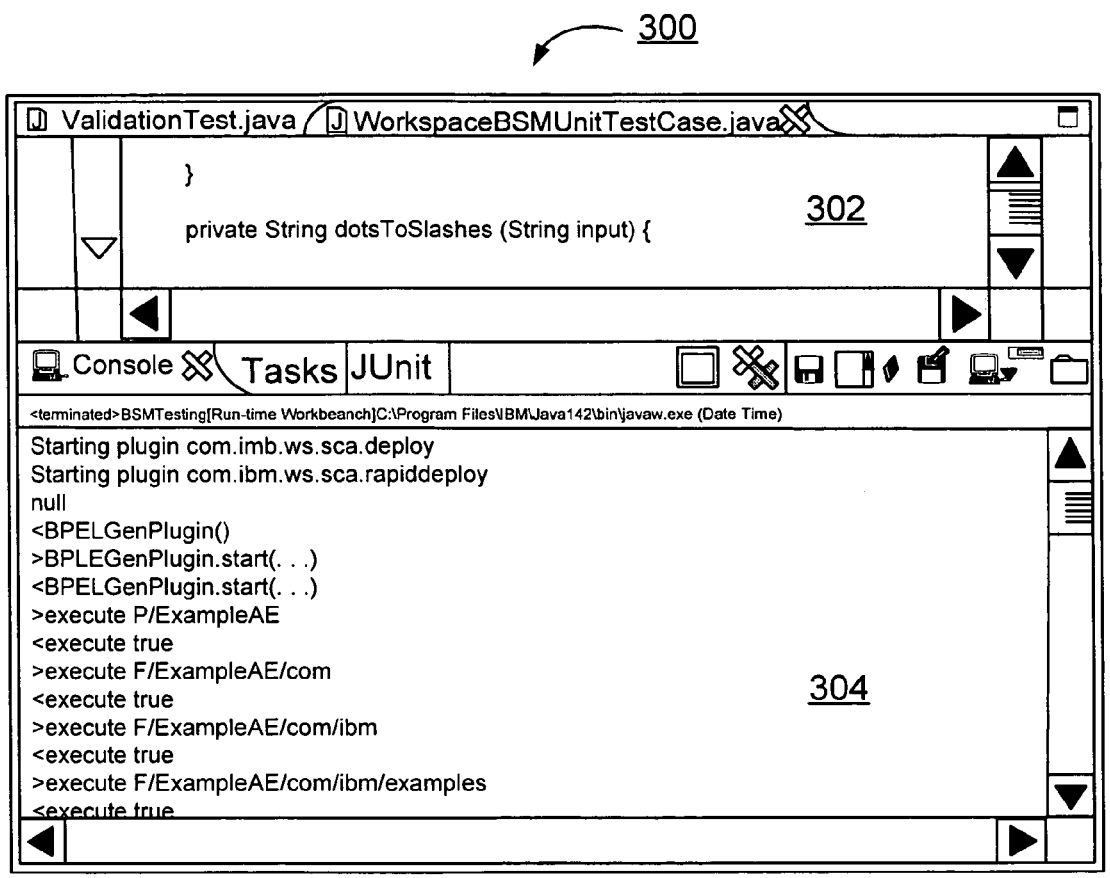

Various commercially available computers can be used for each computer system 100, for example, an IBM personal computer. CPU 102 is suitably programmed by the automatic screen subwindow adjustment program 134 to generate automatic graphical screen subwindows reapportionment of display screens, for example as shown in FIGS. 2, 3, and 4, to receive user selections and options, and to execute the flowcharts of FIGS. 5, and 6 to perform automatic graphical screen subwindows reapportionment methods in a graphical user interface in the computer system 100.

In accordance with features of the preferred embodiment, screen subwindow adjustment program 134 automatically reapportions the amount of screen space given to each subwindow based on the dynamic changes occurring in those subwindows.

In accordance with features of the preferred embodiment, for example, consider an Eclipse perspective that contains a List of Servers view and a Console Log view. As messages are written to the Console Log view, screen subwindow adjustment program 134 grows the amount of space allocated to the Console Log view. Assuming no changes are sensed from the List of Servers view, screen subwindow adjustment program 134 reduces screen space for the List of Servers view. Screen subwindow adjustment program 134 monitors or listens for change messages that many components already can and do issue such change messages when their content changes. For example, the Console Log window issues a change message every time it adds a new line. Similarly, the List of Servers window issues a change message whenever the status of one of its servers changes states.

In accordance with features of the preferred embodiment, consider another example, where many user chat subwindows are combined into a single, fixed sized window. As users send chat messages, their subwindows expands, with a reduction in quiet chat subwindows by the automatic screen subwindow adjustment program 134. This operation of the screen subwindow adjustment program 134 apportions the overall window's space to those chat sessions that are active. As new chat messages are sent, the automatic screen subwindow adjustment program 134 reapportions the screen space. This operation of the screen subwindow adjustment program 134 effectively allows the screen to increased the user's attention on the views that are changing, and decrease the user's attention on views that are static. Features of the automatic screen subwindow adjustment program 134 do not require a lot of code to implement, while significantly helping a display system to focus the user's attention, and to automatically make the best use of a limited screen size.

Every time a change message is received, a selected subwindow's size is increased by size_Increase amount 142, up to the maximum screen size 140. After the specified duration has elapsed without any new change messages, the subwindow's size is decreased by sizeDecrease amount 144, down to the minimum screen size 138. In the first above example, List of Servers view is set, for example, with its sizeIncrease=sizeDecrease=maximumSize. Whenever a server changes status, the List of Servers view would jump to its maximum size. When its duration expires, the List of Servers view contracts to it mimimum size.

Similarly the console Log view is set, for example, with its sizeIncrease to be the height of one line. The minimum size of the console Log view is, for example, 3 lines, and its maximum size is 9 lines. The decrease size of the console Log view could be 3 lines. Normally the console Log view would only show the last three lines. As new lines are added, the console Log view would display more and more lines, for example, up to a maximum of 9 lines. Assuming no more change messages are received after the first duration, then the console Log view shrinks back to 6(=9−3) lines. After the second duration, the view shrinks back to 3 (6−3) lines.

In accordance with features of the preferred embodiment, consider a Java Swing's JSplitPane object that contains two subwindows. By dragging a slider, the user can control the fraction of JSplitPane's screen area used to display each of the two subwindows. The automatic screen subwindow adjustment program 134 senses dynamic change messages in the two subwindows, and automatically adjusts the slider. An enhanced JSplitPane listens for change messages from each subwindow.

Referring now to FIGS. 2, 3, and 4 there are shown exemplary display screens or exemplary display screen windows of the system 100 of FIGS. 1A and 1B respectively illustrating automatic reapportionment of graphical screen subwindows based upon sensed, dynamic changes in accordance with the preferred embodiment.

In FIG. 2, an exemplary display screen window generally designated by the reference character 200 for automatic reapportionment of graphical screen subwindows based upon sensed, dynamic changes in accordance with the preferred embodiment. A pair of subwindows or panels generally designated by the reference characters 202 and 204 is shown in display screen window 200. The upper panel 202 shows Java code and the lower panel 204 shows the console providing messages when running and testing the Java code program. When the Java code is run, messages begin to appear in the lower window 204. At this point the size has not been adjusted because one or more of the criteria have not been met. For example, the rate of change is not high enough yet.

In FIG. 3, another exemplary display screen window generally designated by the reference character 300 includes a pair of subwindows or panels generally designated by the reference characters 302 and 304. In FIG. 3, as the Java code program continues to run, messages begin coming to the console very rapidly and so the lower panel 304 is grown quickly to its maximum size. In the illustrated example, the rate of change is very high in the console window 304 and zero in the Java code window 302. The static Java code window 302 is reduced to its minimum size.

In FIG. 4, another exemplary display screen window generally designated by the reference character 400 includes a pair of subwindows or panels generally designated by the reference characters 402 and 404. In FIG. 4, as the Java code program continues to run, a break point 406 indicated within the Java code panel 402 is hit. A string of code to monitor, such as the break point 406 is set by the user in the Java code and is indicated as a highlighted line. Because this panel 402 including the break point 406, or other monitored dynamic change, such as a failure or an exception in the case of Java code, has a high priority, when the breakpoint or other monitored dynamic change occurs, the panel 402 is updated and is automatically expanded. The adjusted size of the Java code panel 402 can be a set size or simply the maximum. The console panel 404 is reduced, for example, to its minimum size.

While a pair of subwindows is shown in FIGS. 2, 3, and 4 those skilled in the art will realize, this technique advantageously is applied recursively so that multiple subwindows compete for screen space.

Figure 5:
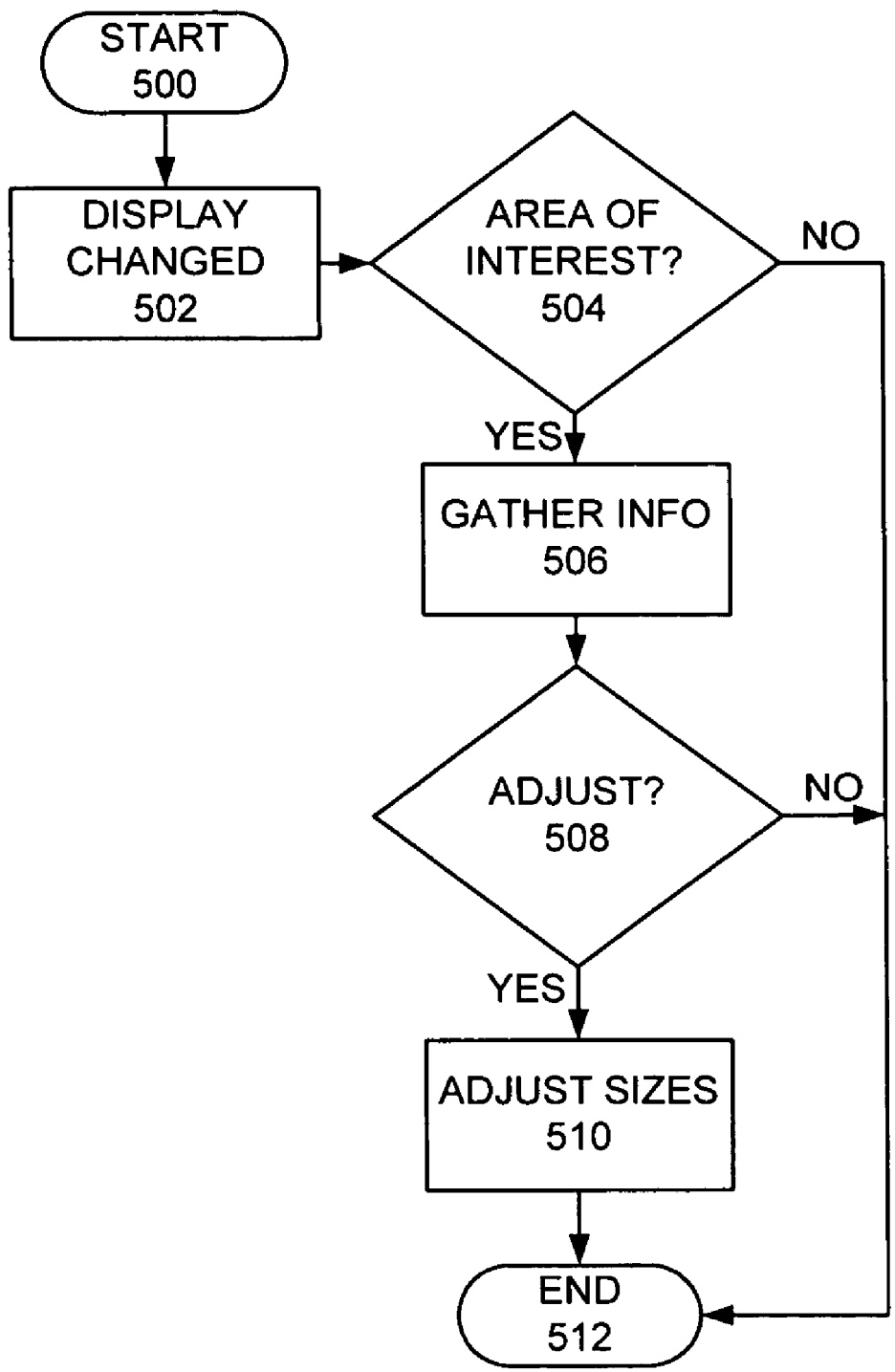
FIGS. 5 and 6 are flow charts illustrating exemplary steps for implementing automatic reapportionment of graphical screen subwindows based upon sensed, dynamic changes in accordance with the preferred embodiment.
Figure 6:
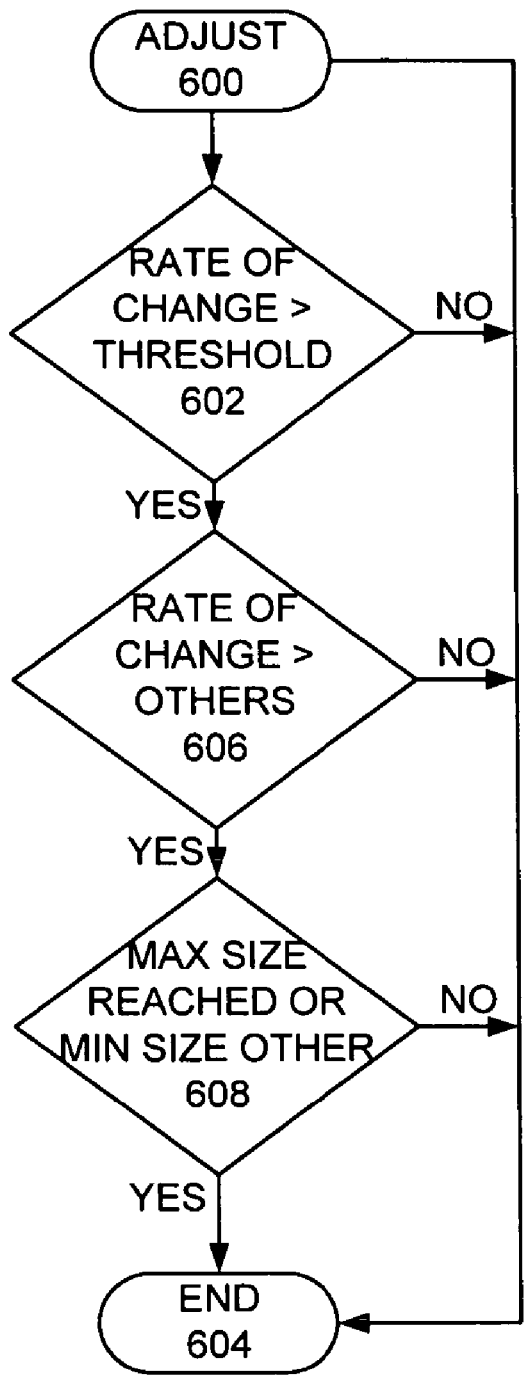

FIGS. 5 and 6 illustrate exemplary steps for implementing automatic reapportionment of graphical screen subwindows based upon sensed, dynamic changes in accordance with the preferred embodiment.

Referring now to FIG. 5, there are shown exemplary steps for implementing automatic reapportionment of graphical screen subwindows based upon sensed, dynamic changes starting at a block 500. A display change is identified as indicated in a block 502. Checking whether the display change is located in an area of interest is performed as indicated in a decision block 504. When the display change is located in an area of interest, such as within a selected subwindow, then information is gathered as indicated in a block 506.

Next a determination is made whether to adjust or reapportion the selected graphical screen subwindows is made as indicated in a decision block 508. An exemplary subroutine to determine whether to adjust or reapportion the selected graphical screen subwindows is illustrated and described with respect to FIG. 6. When adjustment or reapportionment of the selected graphical screen subwindows is determined, then the sizes of selected graphical screen subwindows are adjusted as indicated in a block 510. This completes the exemplary steps as indicated in a block 512.

Referring now to FIG. 6, there are shown exemplary steps to determine whether to adjust or reapportion the selected graphical screen subwindows starting at a block 600. A monitored rate of change for a particular subwindow is compared with a user selected or default threshold value as indicated in a decision block 602. When the monitored rate of change for a particular subwindow is less than or equal to the threshold value, then this completes the exemplary steps as indicated in a block 604.

When the monitored rate of change for a particular subwindow is greater than the threshold value, then the monitored rate of change for the particular subwindow is compared with a monitored rate of change for other subwindows as indicated in a decision block 606. When the monitored rate of change for the particular subwindow is greater than the monitored rate of change for other subwindows, then it is determined if a maximum size has been reached or a minimum size for other subwindows as indicated in a decision block 608. Otherwise, this completes the exemplary steps as indicated at block 604.

Figure 7:
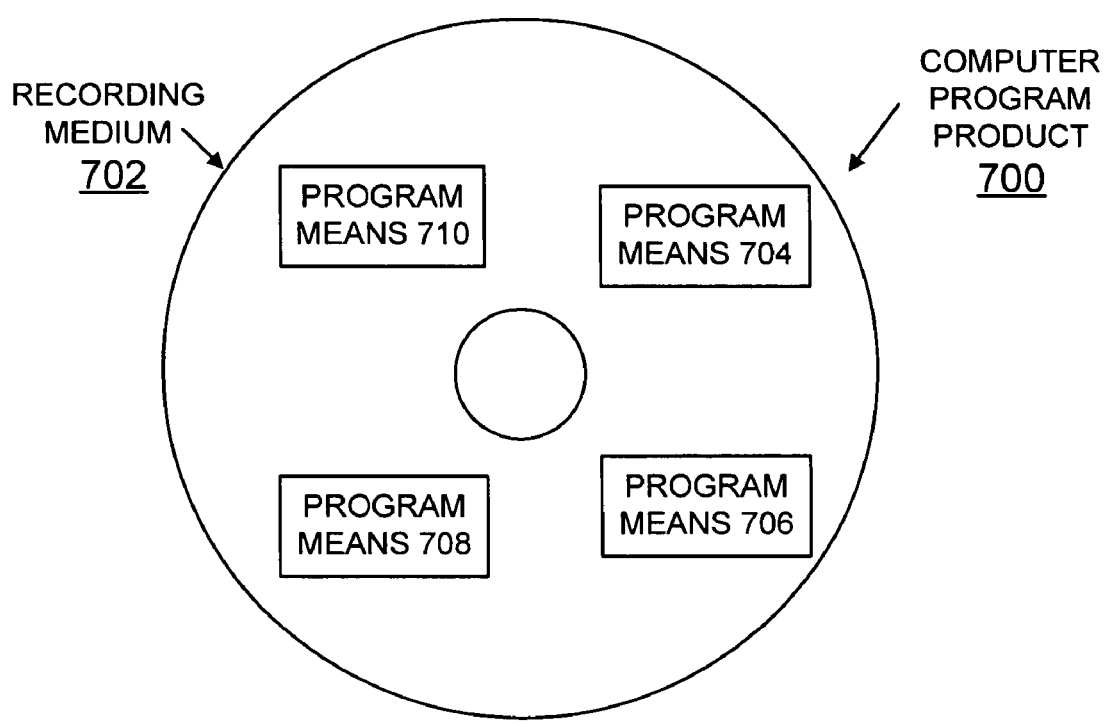
FIG. 7 is a block diagram illustrating a computer program product in accordance with the preferred embodiment.

Referring now to FIG. 7, an article of manufacture or a computer program product 700 of the invention is illustrated. The computer program product 700 includes a recording medium 702, such as, a floppy disk, a high capacity read only memory in the form of an optically read compact disk or CD-ROM, a tape, a transmission type media such as a digital or analog communications link, or a similar computer program product. Recording medium 702 stores program means 704, 706, 708, 710 on the medium 702 for carrying out the methods for implementing automatic reapportionment of graphical subwindows based upon sensed, dynamic changes of the preferred embodiment in the system 100 of FIGS. 1A and 1B.

A sequence of program instructions or a logical assembly of one or more interrelated modules defined by the recorded program means 704, 706, 708, 710, direct the computer system 100 for implementing automatic reapportionment of graphical subwindows based upon sensed, dynamic changes of the preferred embodiment.

While the present invention has been described with reference to the details of the embodiments of the invention shown in the drawing, these details are not intended to limit the scope of the invention as claimed in the appended claims.

What is claimed is:

1. A method for implementing automatic reapportionment of screen subwindows based upon sensed, dynamic changes comprising the steps of:
monitoring predefined dynamic change information for selected subwindows; said predefined dynamic change information including a code string to monitor; said code string to monitor including a breakpoint set by a user; said code string to monitor being included in an application being displayed in one of said selected subwindows; and
comparing the monitored predefined dynamic change information with user selected configuration values to determine a reapportionment for the selected subwindows; and automatically reapportioning an amount of screen space given to each of said selected subwindows based upon said code string occurring in said one of said selected subwindows.

2. A method for implementing automatic reapportionment of screen subwindows as recited in claim 1 wherein the predefined dynamic change information being monitored for selected subwindows includes an exception, a failure, and an amount of information visible.

3. A method for implementing automatic reapportionment of screen subwindows as recited in claim 1 wherein the predefined dynamic change information being monitored for selected subwindows includes a time rate of change of a particular selected subwindow, and a time rate of change of other selected subwindows.

4. A method for implementing automatic reapportionment of screen subwindows as recited in claim 1 wherein the predefined dynamic change information being monitored for selected subwindows includes a current size of a particular selected subwindow and other selected subwindows.

5. A method for implementing automatic reapportionment of screen subwindows as recited in claim 1 wherein the user selected configuration values includes a maximum screen subwindow size, a minimum screen subwindow size, a size increase amount, a duration, and a size decrease amount.

6. A method for implementing automatic reapportionment of screen subwindows as recited in claim 1 wherein the user selected configuration values includes a size increase amount.

7. A method for implementing automatic reapportionment of screen subwindows as recited in claim 1 wherein the user selected configuration values includes a manual size lock.

8. A method for implementing automatic reapportionment of screen subwindows as recited in claim 1 wherein the user selected configuration values include a duration and size decrease amount.

9. A method for implementing automatic reapportionment of screen subwindows as recited in claim 1 wherein the user selected configuration values includes a rate of change threshold value.

10. Apparatus for implementing automatic reapportionment of screen subwindows based upon sensed, dynamic changes comprising:
a graphical user interface (GUI) program for presenting a screen display;
a memory for storing user selected configuration values;
an automatic screen subwindow adjustment program monitoring predefined dynamic change information for selected subwindows; said predefined dynamic change information including a code string to monitor; said code string to monitor including a breakpoint set by a user; said code string to monitor being included in an application being displayed in one of said selected subwindows; and comparing the monitored predefined dynamic change information with said stored user selected configuration values to determine a reapportionment for the selected subwindows; and automatically reapportioning an amount of screen space given to each of said selected subwindows based upon said code string occurring in said one of said selected subwindows.

11. Apparatus for implementing automatic reapportionment of screen subwindows as recited in claim 10 wherein said user selected configuration values include a manual size lock, a maximum screen subwindow size, a minimum screen subwindow size, a size increase amount, a duration, and a size decrease amount.

12. Apparatus for implementing automatic reapportionment of screen subwindows as recited in claim 10 wherein said monitored predefined dynamic change information for selected subwindows include an exception, a failure, an amount of information visible, a time rate of change of a particular selected subwindow, a time rate of change of other selected subwindows, a current size of a particular selected subwindow and other selected subwindows.

13. A computer-storage medium encoded with a computer program product for implementing automatic reapportionment of screen subwindows based upon sensed, dynamic changes in a computer system, said computer-storage medium consisting one of a floppy disk, a high capacity read only memory in the form of an optically read compact disk or CD-ROM, and a tape, said computer-storage medium including instructions executed by the computer system to cause the computer system to perform the steps of:

monitoring predefined dynamic change information for selected subwindows; said predefined dynamic change information including a code string to monitor; said code string to monitor including a breakpoint set by a user; said code string to monitor being included in an application being displayed in one of said selected subwindows; and comparing the monitored predefined dynamic change information with user selected configuration values to determine a reapportionment for the selected subwindows; and automatically reapportioning an amount of screen space given to each of said selected subwindows based upon said code string occurring in said one of said selected subwindows.

14. The computer-storage medium encoded with a computer program product for implementing automatic reapportionment of screen subwindows as recited in claim 13 wherein the step of monitoring predefined dynamic change information for selected subwindows includes the steps of monitoring an amount of information visible.

15. The computer-storage medium encoded with a computer program product for implementing automatic reapportionment of screen subwindows as recited in claim 13 wherein the step of monitoring predefined dynamic change information for selected subwindows includes the steps of monitoring a time rate of change of a particular selected subwindow, and a time rate of change of other selected subwindows.

16. The computer-storage medium encoded with a computer program product for implementing automatic reapportionment of screen subwindows as recited in claim 13 wherein the step of monitoring predefined dynamic change information for selected subwindows includes the steps of monitoring an exception, and a failure.

17. The computer-storage medium encoded with a computer program product for implementing automatic reapportionment of screen subwindows as recited in claim 13 wherein the step of monitoring predefined dynamic change information for selected subwindows includes the steps of monitoring a current size of a particular selected subwindow and other selected subwindows.

18. The computer-storage medium encoded with a computer program product for implementing automatic reapportionment of screen subwindows as recited in claim 13 includes the step of storing said user selected configuration values; and wherein said user selected configuration values include a manual size lock, a maximum screen subwindow size, a minimum screen subwindow size, a size increase amount, a duration, and a size decrease amount.

* * * * *